United States Patent
Mao et al.

(10) Patent No.: US 11,187,299 B1
(45) Date of Patent: Nov. 30, 2021

(54) BIDIRECTIONAL SELF-LOCKING DAMPER

(71) Applicant: Ningbo Fenghua Rising New Energy Technology Co., Ltd., Zhejiang (CN)

(72) Inventors: Lina Mao, Zhejiang (CN); Weixin Feng, Zhejiang (CN); Rong Li, Zhejiang (CN)

(73) Assignee: Ningbo Fenghua Rising New Energy Technology Co., Ltd., Ningbo (CN)

( * ) Notice: Subject to any disclaimer, the term of this patent is extended or adjusted under 35 U.S.C. 154(b) by 0 days.

(21) Appl. No.: 17/319,083

(22) Filed: May 12, 2021

Related U.S. Application Data

(63) Continuation of application No. PCT/CN2021/088313, filed on Apr. 20, 2021.

(30) Foreign Application Priority Data

Mar. 30, 2021  (CN) .......................... 202110341652.1

(51) Int. Cl.
  *F16F 9/512*    (2006.01)
  *F16F 9/34*     (2006.01)
  (Continued)

(52) U.S. Cl.
  CPC ............ *F16F 9/5126* (2013.01); *F16F 9/185* (2013.01); *F16F 9/34* (2013.01); *F16F 9/369* (2013.01);
  (Continued)

(58) Field of Classification Search
  CPC .. F16F 9/5126; F16F 9/512; F16F 9/34; F16F 9/3405; F16F 9/348; F16F 9/3488;
  (Continued)

(56) References Cited

U.S. PATENT DOCUMENTS

| | | | | |
|---|---|---|---|---|
| 4,396,098 A | * | 8/1983 | Petrak | F16F 9/512 188/280 |
| 6,918,473 B2 | * | 7/2005 | Deferme | F16F 9/5126 188/282.1 |

(Continued)

FOREIGN PATENT DOCUMENTS

| | | | | |
|---|---|---|---|---|
| DE | 4238728 A1 | * | 5/1994 | ............. F16F 9/512 |
| GB | 768698 A | * | 2/1957 | ............. F16F 9/512 |

(Continued)

*Primary Examiner* — Robert A. Siconolfi
*Assistant Examiner* — Mahbubur Rashid

(57) ABSTRACT

The present application discloses a bidirectional self-locking damper that comprises a cylinder and a piston assembly housed in the cylinder and displaceable along the axial direction of the cylinder. The piston assembly includes a piston rod, a piston and a bidirectional self-locking valve. The bidirectional self-locking valve includes a valve body and a locking assembly. The valve body is provided with a passage chamber, and a first passage channel and a second passage channel that are communicated with the passage chamber, the first passage channel communicating with a recovery pressure chamber, the second passage channel communicating with a compression pressure chamber; the locking assembly is directed to displace in the passage chamber driven by the work medium for establishing/interrupting the communication between the first or second passage channel and the passage chamber.

7 Claims, 10 Drawing Sheets

(51) Int. Cl.
*F16F 9/18* (2006.01)
*F16F 9/36* (2006.01)
*F16K 27/02* (2006.01)
*F16F 15/023* (2006.01)

(52) U.S. Cl.
CPC ............ *F16K 27/02* (2013.01); *F16F 15/023* (2013.01); *F16F 2222/12* (2013.01); *F16F 2228/066* (2013.01); *F16F 2230/0041* (2013.01); *F16F 2232/08* (2013.01); *F16F 2234/02* (2013.01)

(58) Field of Classification Search
CPC .......... F16F 9/504; F16F 9/3482; F16F 9/516; F16F 9/466; F16F 9/465; F16F 2228/066
See application file for complete search history.

(56) References Cited

U.S. PATENT DOCUMENTS

| | | | | |
|---|---|---|---|---|
| 7,395,907 | B2 * | 7/2008 | de Kock | F16F 9/512 |
| | | | | 137/614.2 |
| 7,722,061 | B2 * | 5/2010 | Kohls | F16F 9/5126 |
| | | | | 280/90 |
| 8,844,687 | B2 * | 9/2014 | Yu | F16F 9/5126 |
| | | | | 188/280 |
| 9,164,457 | B2 * | 10/2015 | Machida | G03G 15/502 |
| 9,435,394 | B2 * | 9/2016 | Teraoka | F16F 9/348 |
| 2005/0109571 | A1 * | 5/2005 | Burkert | F16F 9/5126 |
| | | | | 188/322.15 |
| 2012/0234639 | A1 * | 9/2012 | Teraoka | F16F 9/348 |
| | | | | 188/280 |
| 2012/0312648 | A1 * | 12/2012 | Yu | F16F 9/5126 |
| | | | | 188/280 |
| 2013/0020158 | A1 * | 1/2013 | Park | F16F 9/34 |
| | | | | 188/280 |
| 2013/0140117 | A1 * | 6/2013 | Yu | F16F 9/3405 |
| | | | | 188/280 |
| 2014/0353097 | A1 * | 12/2014 | Kim | F16F 9/5126 |
| | | | | 188/313 |
| 2015/0354660 | A1 * | 12/2015 | Komatsu | F16F 9/5126 |
| | | | | 188/280 |

FOREIGN PATENT DOCUMENTS

| | | | | |
|---|---|---|---|---|
| JP | 57171134 | A * | 10/1982 | ............. F16F 9/512 |
| JP | 63083423 | A * | 4/1988 | ............. F16F 9/512 |

* cited by examiner

BIDIRECTIONAL SELF-LOCKING DAMPER

CROSS-REFERENCE TO RELATED APPLICATION

The present application is a continuation of international application of PCT application No. PCT/CN2021/088313 filed on Apr. 20, 2021, which claims the priority benefit of China application No. 202110341652.1 filed on Mar. 30, 2021. The entirety of the above-mentioned patent application is incorporated herein by reference and made a part of this specification.

BACKGROUND

Technical Field

The present application relates to the technical field of dampers, in particular to a bidirectional self-locking damper.

Description of Related Art

A damper is a device that provides resistance to motion and consumes motion energy, and is widely used in related mechanical fields such as an automotive field and an automation field. In the field of a solar photovoltaic power generation, dampers are also widely used. A solar photovoltaic power generation device is a new type of power generation system that uses the photovoltaic effect of solar cell semiconductor materials to directly convert solar radiation energy into electrical energy. One of its core components is a photovoltaic panel module. The photovoltaic panel module is composed of multiple photovoltaic panel units and is mainly used to absorb solar radiation energy. The entire power generation device is arranged in an open outdoor area, and the photovoltaic panel modules will shake under the wind. The damper mounted here is mainly used to reduce the shaking amplitude of the photovoltaic panel module to maintain the receiving effect of solar radiation energy.

The damper currently applied to the photovoltaic panel module can generate a damping force of about 5000N~10000N when the photovoltaic panel unit is at a moving speed of 0.1 m/s. The inventor believes that in order to better receive the solar radiation energy, the photovoltaic panel module should be kept stationary after the adjustment of the angle thereof is completed. However, the damping force generated by the existing damper structure is not large under the condition of large external load, and the photovoltaic panel module still shakes severely under strong wind conditions, and cannot achieve the ideal effect of receiving the solar radiation energy. Meanwhile, the shaking at different levels brings hidden dangers to the safety and life of the entire photovoltaic system.

SUMMARY

In order to make the damper generate a large damping force when subjected to a large external load force, the present application provides a bidirectional self-locking damper.

The bidirectional self-locking damper provided by the present application adopts the following technical solutions. A bidirectional self-locking damper, including a cylinder sealed with a work medium and a piston assembly housed in the cylinder and displaceable along the axial direction of the cylinder, and the piston assembly includes:

a piston rod that includes a working portion extending into the cylinder and a first mounting portion extending out of the cylinder;

a piston that is connected to the working portion and divides the cylinder into a recovery pressure chamber and a compression pressure chamber; and a bidirectional self-locking valve that is connected to the working portion, the bidirectional self-locking valve including:

a valve body that is provided with a passage chamber and a first passage channel and a second passage channel that are communicated with the passage chamber, the first passage channel communicating with the recovery pressure chamber, and the second passage channel communicating with the compression pressure chamber;

a locking assembly that is placed in the passage chamber; the locking assembly is directed to displace in the passage chamber driven by the work medium for establishing/interrupting the communication between the first passage channel or the second passage channel and the passage chamber.

By adopting the above technical solution, when the damper is subjected to an external load force, the piston assembly undergoes axial displacement in the cylinder, forcing the work medium in the cylinder to flow in the recovery pressure chamber and the compression pressure chamber, and the work medium during the flowing passes the first passage channel and the second passage channel so as to realize a first retardation, so that the displacement of the piston rod is retarded. Meanwhile, after the work medium enters the passage chamber, it drives the locking assembly arranged in the passage chamber to interrupt the communication between the first passage channel/the second passage channel and the passage chamber to achieve the effect of interrupting the communication between the recovery pressure chamber and the compression pressure chamber, thereby inhibiting the displacement of the piston rod and producing a huge damping force, which has a better limit effect on the external load.

Preferably, one of the first passage channel and the second passage channel is always kept in communication with the passage chamber, and the locking assembly is used to establish/interrupt the communication between the other passage channel and the passage chamber.

By adopting the above technical solution, since one of the passage channels is always in communication with the passage chamber, the compression space of the work medium is increased. After the locking assembly interrupts the communication between one of the passage channels and the passage chamber, the piston rod also has a certain displacement range, thereby achieving the effect of a slow locking, reducing the shaking when the external load produces a sudden change in speed during a rapid locking, and meanwhile the entire damper is protected and its service life is increased.

Preferably, the locking assembly includes:

a spool unit that includes a main body and a first locking portion and a second locking portion that are respectively connected at both sides of the main body for establishing/interrupting the communication between the first passage channel or the second passage channel and the passage chamber; and an elastic compensation unit that is distributed on both sides of the main body to force the spool unit always to have a movement trend of resetting movement.

By adopting the above technical solution, the elastic compensation units acting on both sides of the spool unit can realize that when the external load force is within a certain range, both the first and second passage channels are maintained in a state of communicating with the passage chamber, so as to enable the external load to displace at a certain speed; when the external load force exceeds an expected force value, one of the elastic compensation units is overcome and elastically deformed, so that the spool unit interrupts the communication between one of the passage channels and the passage chambers, thereby achieving the locking effect on the piston rod. When the external load force is reduced within an expected force value range, the elastic compensation unit releases the elastic potential energy to push the spool unit to make a reset movement, which can continue to make the piston rod displaced at a certain speed.

Preferably, the first locking portion includes a first tip, the second locking portion includes a second tip, the first tip and the second tip both have a tapered sealing surface, and one of the tapered sealing surfaces is provided with a diversion section; when the tapered sealing surface with the diversion section abuts against the opening of the first passage channel/the second passage channel, an overflow port that is communicated with the passage chamber is formed between the first passage channel/the second passage channel and the diversion section.

By adopting the above technical solution, when one of the tapered sealing surfaces abuts against the opening of the first passage channel/the second passage channel, the overflow port formed by the provision of the diversion section makes the recovery pressure chamber still in communication with the compression pressure chamber, and the piston rod can still be capable of displacing at this time, but the formation of the overflow port has a better damping effect on the flow of the work medium, and produces a larger damping force for the external load. Moreover, the work medium can circulate in the cylinder, which can effectively avoid the occurrence of idle stroke due to that the work medium does not flow back and the air is left above the cylinder when the piston rod moves in the reverse direction, and can improve the stability of the damper.

Preferably, the main body divides the passage chamber into a first chamber and a second chamber, and the outer peripheral surface of the main body abuts against the inner wall of the passage chamber, and the main body is provided with at least one damping channel communicating the first chamber with the second chamber.

By adopting the above technical solution, the main body acts like a piston due to its outer peripheral surface abutting against the inner wall of the passage chamber. When the external load force is within a certain range, the driving force of the work medium on the spool unit is not enough to force the spool unit to interrupt the communication between the first passage channel/second passage channel and the passage chamber. At this time, the work medium will flow through the damping channel on the main body while flowing in the passage chamber, thereby playing the role of a secondary slowing of the work medium, and further improving the retarding effect of the piston rod, and producing a greater damping force to the external load.

Preferably, the valve body includes a valve seat and a valve cover;
the passage chamber and the first passage channel are provided on the valve seat, and one end of the valve seat is provided with a locking groove communicating with the passage chamber;
the second passage channel is provided on the valve cover; the valve cover includes a base and an extension portion connected to one end of the base, the outer peripheral surface of the base is in sealing connection with the inner wall of the locking groove, and the end face of the base abuts against the bottom of the locking groove and forms a first sealing portion, and the extension portion is introduced into the passage chamber from one end of the base.

By adopting the above technical solution, the mating connection between the valve cover and the valve seat enables the entire valve body to be arranged separately, which is convenient for overall disassembly and assembly. Meanwhile the sealing connection between the base and the inner wall of the locking groove, in combination with the first sealing portion formed after the end face of the base abuts against the bottom of the locking groove, greatly improves the sealing performance of the passage chamber.

Preferably, the working portion has a damping chamber communicating the recovery pressure chamber with the compression pressure chamber, and the bidirectional self-locking valve is mounted in the damping chamber.

By adopting the above technical solution, the arrangement of the damping chamber firstly provides a mounting space for the entire bidirectional self-locking valve, and meanwhile, the damping chamber also serves as a storage area for the work medium, which can reduce the impact damage of the work medium to the bidirectional self-locking valve.

Preferably, the piston rod is provided with an inlet channel and a transfer channel, the inlet channel communicates the recovery pressure chamber with the transfer channel, and the transfer channel communicates with the damping chamber; in which the inlet channel and the transfer channel are communicated and form an angle.

By adopting the above technical solution, the work medium will flow from the recovery pressure chamber to the inlet channel under the driving force of the piston, and then flow from the inlet channel to the transfer channel. Due to the angle between the inlet channel and the transfer channel, when the work medium flows into the transfer channel, a part of the kinetic energy will be consumed due to the sudden change in speed, which reduces the shaking of the whole damper caused by the work medium impacting the bidirectional self-locking valve due to the excessively fast flow rate. Meanwhile, the service life of the damper is better improved.

Preferably, the passage chamber has a flaring communicating with the transfer channel.

By adopting the above technical solution, the formation of the flaring allows the work medium to increase the flow rate when it flows from the transfer channel to the passage chamber. Due to the expansion of the cross-section, the stress concentration caused by the impacting of the work medium on the bidirectional self-locking valve can be reduced, the stability of the work medium when flowing is improved meanwhile, and the shaking of the entire damper during operation can be reduced.

Preferably, the outer peripheral surface of the valve seat and the inner wall of the damping chamber are in a sealed connection, and the end face of the valve seat and the end face of the working portion abut and form a second sealing portion.

By adopting the above technical solution, the formation of the second sealing portion improves the sealing performance of the damping chamber.

In summary, this application includes at least one of the following beneficial technical effect.

1. By providing the damping chamber on the working portion of the piston rod and mounting the bidirectional self-locking valve within the damping chamber, the flow of the work medium in the cylinder is used to drive the locking assembly in the bidirectional self-locking valve to move in the passage chamber so as to realize to cut the communication between the first passage channel or the second passage channel and the passage chamber, thereby generating a relatively large damping force, and realizing the effect of limiting the external load;

2. By arranging elastic compensation units on both sides of the spool unit, the external load force within a certain range can be counteracted, so that the displacement amount of the entire spool unit is not enough to cut the communication between the first passage channel or the second passage channel and the passage chamber, thereby realizing the slow displacement of the piston rod without affecting the normal movement of external components;

3. By tightly connecting the main body of the spool unit and the passage chamber, the flow path of the work medium from the outer peripheral surface of the main body and the inner wall of the passage chamber is blocked. The damping channel provided on the main body is used for the passage of the work medium, realizing the secondary slow flow effect on the work medium, and better increasing the retarding effect of the entire damper;

4. By forming the overflow port by providing the diversion section on one of the tapered sealing surfaces, the piston rod maintains the communication between the recovery pressure chamber and the compression pressure chamber in one of the working modes of extending or retracting, and realizes the internal circulation of the work medium, which can effectively avoid the occurrence of idle stroke caused by the air remaining in the cylinder when the piston rod performs in the other working mode, and can improve the stability of the damper;

5. The split type valve body improves the convenience in the disassembly and assembly. Meanwhile, through the sealing connection between the valve cover and the locking groove, the sealing connection between the valve seat and the damping chamber, and the first sealing portion and the second sealing portion respectively formed between the ends, the overall sealing of the passage chamber and the damping chamber is strengthened, so that the operation of the damper is more stable.

DESCRIPTION OF THE EMBODIMENTS

The application will be further described in detail below in conjunction with the accompanying drawings.

It should be noted that when an element is referred to as being "fixed to" another element, it may be directly fixed to the other element, or an intermediate element may also be present. When an element is considered to be "connected" to another element, it can be directly connected to another element, or an intermediate element may also be present meanwhile. The terms "vertical", "horizontal", "left", "right" and similar expressions used herein are for illustrative purposes only, and do not mean that they are the only embodiments.

Unless otherwise defined, all technical and scientific terms used herein have the same meaning as commonly understood by those skilled in the technical field of this application. The terms used in the description of the present invention herein are only for the purpose of describing specific embodiments, and are not intended to limit the present invention. The term "and/or" as used herein includes any and all combinations of one or more related listed items.

Figure 1:
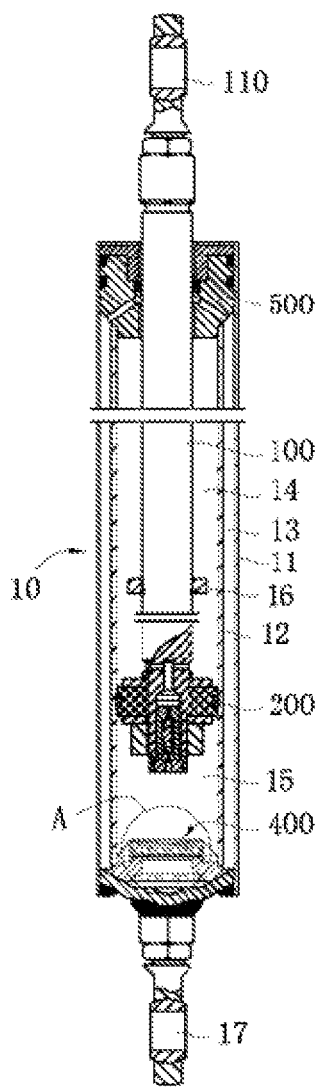
FIG. 1 is a schematic structural diagram of a bidirectional self-locking damper.

Referring to FIG. 1, an embodiment of the present application discloses a bidirectional self-locking damper that includes a cylinder, a guider 500 mounted at an upper opening of the cylinder, and a piston assembly capable of axially sliding in the cylinder and free to extend into and retract from the cylinder, and a compression valve assembly 400 mounted at a lower opening of the cylinder.

A work medium is enclosed in the cylinder, and the work medium is usually hydraulic oil, of course, it can also be other fluids. Further, the cylinder includes an outer cylinder 11 and an inner cylinder 12 which are coaxially arranged. The outer and inner cylinders 11 and 12 are spaced apart to form an oil storage chamber 13. The piston assembly is placed in the inner cylinder 12 and can displace along the axial direction of the inner cylinder 12.

The piston assembly includes a piston rod 100 and a piston 200 connected to an end of the piston rod 100. The piston rod 100 is supported by the guider 500 to achieve a guided sliding. One end of the piston rod 100 is a working portion, and the other end is a first mounting portion 110. The piston 200 is connected to the working portion, and the working portion is housed in the inner cylinder 12. The first mounting portion 110 extends out from the inner cylinder 12. A second mounting portion 17 is connected to the cylinder at the end of the compression valve assembly 400. Both of the first mounting portion 110 and the second mounting portion 17 are used for connecting an external component.

The piston 200 divides the inner cylinder 12 into a recovery pressure chamber 14 and a compression pressure chamber 15. When the piston rod 100 is in the contracted mode, the piston 200 moves toward the side of the compression valve assembly 400; when the piston rod 100 is in the extended mode, the piston 200 moves toward the side of the guider 500. The piston rod 100 is also provided with a rebound buffer 16, and the distance between the rebound buffer 16 and the guider 500 is the maximum stroke displacement when the piston rod 100 is extended.

Figure 2:
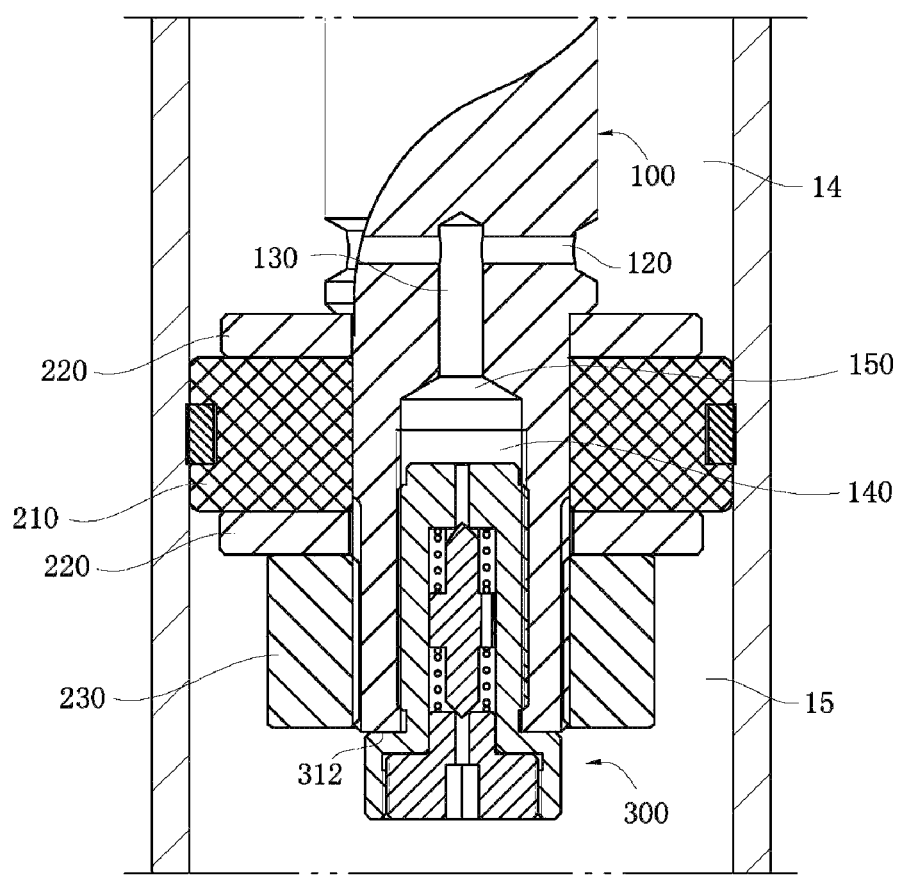
FIG. 2 is a schematic diagram of the connection between the bidirectional self-locking valve and a piston rod.

Referring to FIGS. 1 and 2 together, the outer circumference of the piston 200 and the inner cylinder 12 are matched without a clearance, so that the work medium in the recovery pressure chamber 14 and the compression pressure chamber 15 cannot pass through a gap between the outer circumference surface of the piston 200 and the inner cylinder 12. The piston 200 includes a piston main body 210, a limit plate 220 that abuts on both two ends of the piston main body 210, and a lock nut 230 that is pressed on one of the limit plates 220. The limit plate 220 can prevent the piston main body 210 from being deformed due to the pressure generated by the work medium during the movement.

The entire piston assembly also includes a bidirectional self-locking valve 300 mounted on the working portion for establishing or interrupting the communication between the recovery pressure chamber 14 and the compression pressure chamber 15. Specifically, the working portion has a damping chamber 140, and the bidirectional self-locking valve 300 is mounted in the damping chamber 140. In addition, the piston rod 100 is also radially provided with an inlet channel 120, and meanwhile, a transfer channel 130 is axially provided in the piston rod 100. The inlet channel 120 communicates with the recovery pressure chamber 14, and the transfer channel 130 communicates with inlet channel 120 and the damping chamber 140 respectively. The inlet channel 120 and the transfer channel 130 intersect and are in a vertical state, so that when the work medium enters the transfer channel 130, the speed changes suddenly and a certain amount of kinetic energy is consumed. The damping chamber 140 has a flaring 150 communicating with the transfer channel 130, and the larger end of the flaring 150 is far away from the side of the transfer channel 130, so that the work medium flowing to the bidirectional self-locking valve 300 is more stable.

Figure 3:
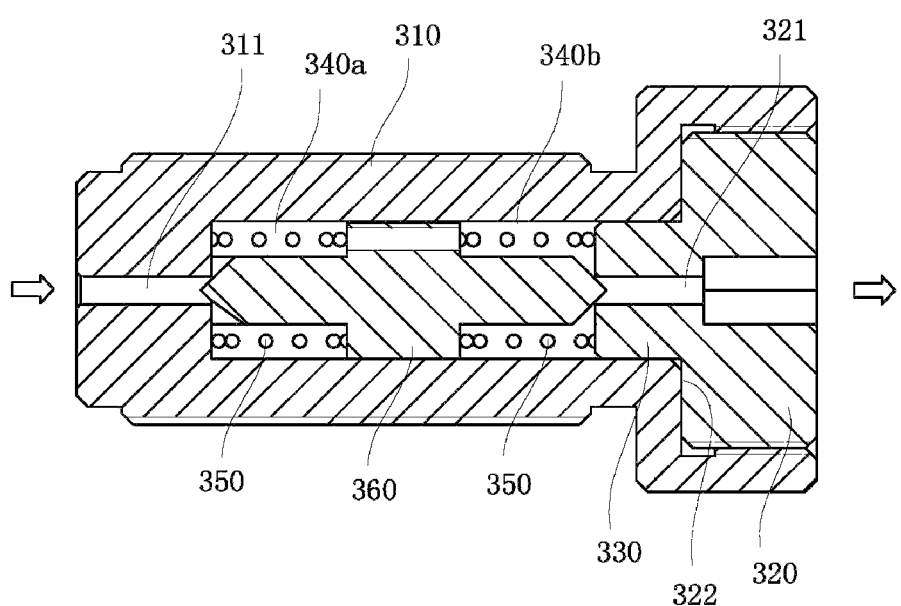
FIG. 3 is a schematic structural diagram of the bidirectional self-locking valve in an open state.

Referring to FIGS. 2 and 3 together, the bidirectional self-locking valve 300 includes a valve body and a locking assembly housed in the valve body. The valve body is a split type, including a valve seat 310 and a valve cover. The valve seat 310 is provided with the passage chamber, a locking groove communicating with one side of the passage chamber, and a first passage channel 311 communicating with the other side of the passage chamber. The valve cover is mounted in the locking groove and includes an integral base 320 and an extension portion 330. The base 320 is threadedly connected with the locking groove to achieve a sealed connection, and the extension portion 330 is introduced into the passage chamber. The integral valve cover is also provided with a through second passage channel 321 that communicates with the passage chamber. The end face of the base 320 abuts against the bottom of the locking groove to form a first sealing portion 322. The valve seat 310 also cooperates with the damping chamber 140 in a threaded connection to achieve a sealed connection, and the end face of the valve seat 310 abuts against the end face of the working portion to form a second sealing portion 312. And both threaded contact positions are coated with anaerobic glue to improve the sealing performance.

After the entire bidirectional self-locking valve 300 is mounted in the damping chamber 140, the first passage channel 311 is in communication with the damping chamber 140, and the second passage channel 321 is in communication with the compression pressure chamber 15. When the bidirectional self-locking valve 300 is activated, the work medium can flow smoothly between the recovery pressure chamber 14 and the compression pressure chamber 15.

Figure 4:
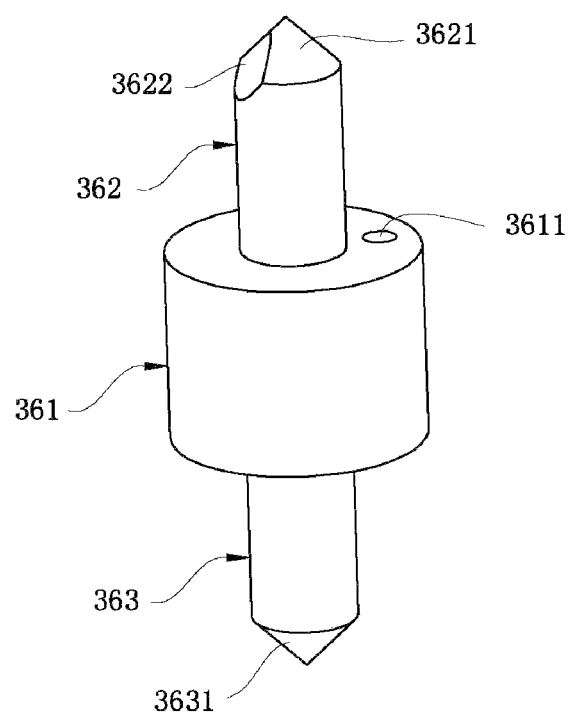
FIG. 4 is a schematic structural diagram of a spool unit.

Referring to FIGS. 3 and 4 together, the locking assembly is confined in the passage chamber, and includes a spool unit 360 and two elastic compensation units 350 acting on the spool unit 360. The spool unit 360 includes an integral main body 361, and a first locking portion 362 and a second locking portion 363 located on both sides of the main body 361 respectively. The main body 361 divides the passage chamber into a first chamber 340a and a second chamber 340b, and its outer peripheral wall abuts against the inner wall of the passage chamber so as to be sealed. Meanwhile, the main body 361 is also provided with a damping channel 3611 that communicates with the first chamber 340a and the second chamber 340b.

The first locking portion 362 includes a first tip 3621, and the second locking portion 363 includes a second tip 3631. The first tip 3621 faces the side of the first passage channel 311, and the second tip 3631 faces the side of the second flow channel 321. Both the first tip 3621 and the second tip 3631 have a tapered sealing surface, and the tapered sealing surface abuts against the opening of the first passage channel 311 or the second passage channel 321 to realize the cut of the passage chamber.

The elastic compensation unit 350 is preferably a compression spring and is arranged on both sides of the main body 361, and the spool unit 360 can maintain a relatively static state under the action of the two elastic compensation unit units.

Figure 5:
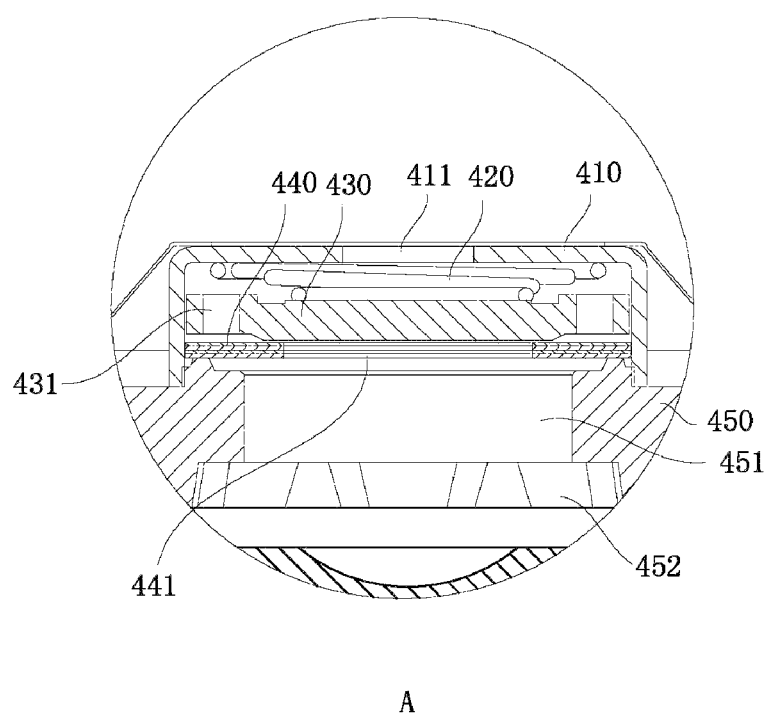
FIG. 5 is an enlarged view of part A of FIG. 1.

Referring to FIGS. 1 and 5 together, the compression valve assembly 400 includes a compression valve seat 450, a compression valve plate 440, a compression valve body 430, an elastic member 420, and a retainer 410 that are stacked in sequence. The compression valve plate 440, the compression valve body 430 and the elastic member 420 are defined between the compression valve seat 450 and the retainer 410. The retainer 410 is provided with a first diversion hole 411 communicating with the compression pressure chamber 15. The compression valve body 430 is provided with a second diversion hole 431. The compression valve plate 440 is provided with a third diversion hole 441, and the compression valve seat 450 is provided with a fourth diversion hole 451 and a fifth diversion hole 452. The diversion holes are in communication with each other, and the oil storage chamber 13 is also in communication with the fifth diversion hole 452.

Figure 6:
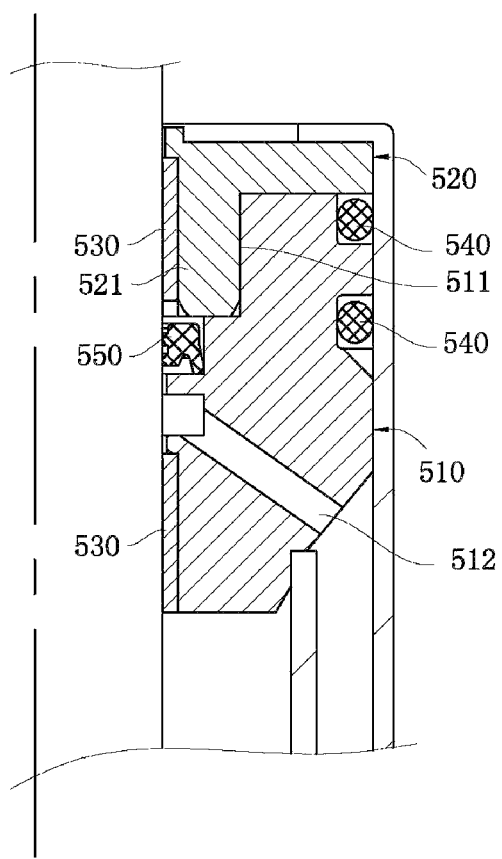
FIG. 6 is a schematic structural diagram of a guider.

Referring to FIGS. 1 and 6 together, the guider 500 includes a first guide seat 510 and a second guide seat 520. The inner circumference of the first guide seat 510 and the second guide seat 520 surround the outer circumference of the piston rod 100. At least one sealing ring 540 is embedded on the outer circumference of the first guide seat 510. The sealing ring 540 abuts against the outer cylinder 11 to perform a sealing function. The first guide seat 510 also has an assembly groove 511, and the second guide seat 520 includes a positioning protrusion 521 inserted into the assembling groove 511. The inner circumference of the first guide seat 510 and the positioning protrusion 521 are both fitted with a shaft sleeve 530. The two shaft sleeves 530 are encased on the outer circumference of the piston rod 100. Meanwhile, a shaft seal 550 is mounted on the inner circumference of the first guide seat 510. The shaft seal 550 is also encased on the outer circumference of the piston rod 100. The first guide seat 510 is provided with an overflow passage 512 communicating the recovery pressure chamber 14 and the oil storage chamber 13. The first guide seat 510 and the second guide seat 520 combined with the two shaft sleeves 530 enable the piston rod 100 to have better axial guiding performance when entering and exiting the inner cylinder 12.

When the bidirectional self-locking damper 10 receives an external load force within an expected range, the bidirectional self-locking valve 300 is in an open state. Taking FIG. 3 as an example, the flow of the work medium in one direction is shown in which the piston rod 100 is in the extended mode. In this mode, a part of the work medium enters the oil storage chamber 13 from the recovery pressure chamber 14 through the overflow passage 512, and then enters the compression valve assembly 400 from the oil storage chamber 13. The work medium entering the compression valve assembly 400 overcomes the elastic force of the elastic member 420 and finally flows through the first diversion hole 411 and enters the compression pressure chamber 15. Another part of the work medium flows from the recovery pressure chamber 14 through the inlet channel 120, the transfer passage channel 130, the damping chamber 140, the first passage channel 311, the first chamber 340a, the damping channel 3611, and the second chamber. 340b and the second passage channel 321 into the compression pressure chamber 15. The bidirectional self-locking damper 10 in this mode generates a certain damping force to the external.

Figure 7:
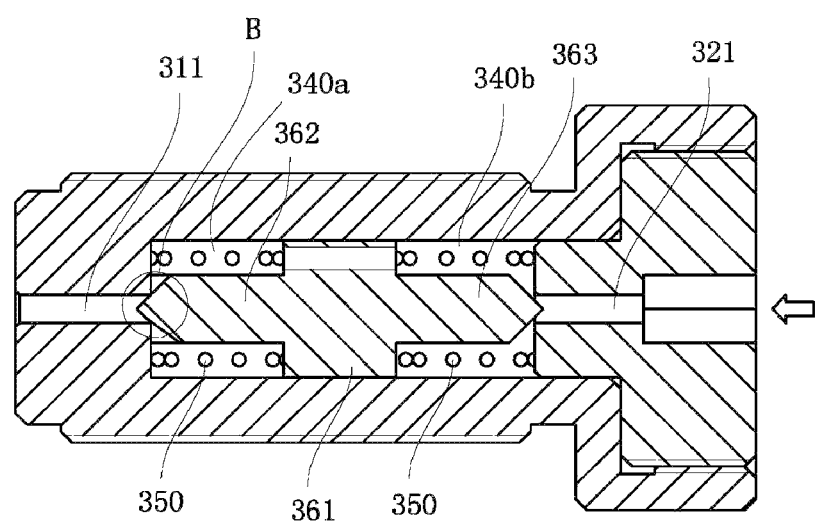
FIG. 7 is a schematic diagram of the state of the bidirectional self-locking valve when the piston rod is retracted.
Figure 8:
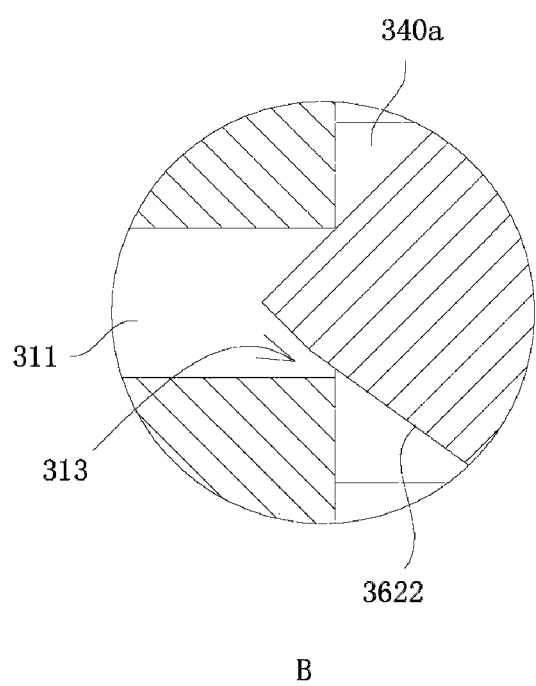
FIG. 8 is an enlarged view of part B of FIG. 7.

When the bidirectional self-locking damper 10 receives an external load force exceeding the expected range, the bidirectional self-locking valve 300 is in a closed state. With reference to FIGS. 7 and 8, the arrow indicates the flow direction of the work medium, and the piston rod 100 is in the contracted mode. In this mode, the work medium drives the compression valve body 430 to close the third diversion hole 441 of the compression valve plate 440, so that the entire compression valve assembly 400 is closed, and the work medium can only enter the passage chamber through the second passage channel 321. The spool unit 360 is driven to move toward the side of the first passage channel 311 since the external load force is too large to overcome the elastic force of one of the elastic compensation units 350. At this time, the tapered sealing surface of the first tip 3621 gradually abuts against the opening of the first passage channel 311, but due to the provision of the diversion section 3622, the overflow port 313 is formed between it and the first passage channel 311, and then the first passage channel 311 still communicates with the first chamber 340a of the passage chamber, and the work medium flows through the first passage channel 311 and is transferred into the recovery pressure chamber 14. However, since the diameter of the overflow port 313 is smaller than the opening of the first passage channel 311, the damping force during the flow of the work medium is increased. At this time, the entire bidirectional self-locking damper 10 will generate a huge damping force to suppress the displacement of external components.

Figure 9:
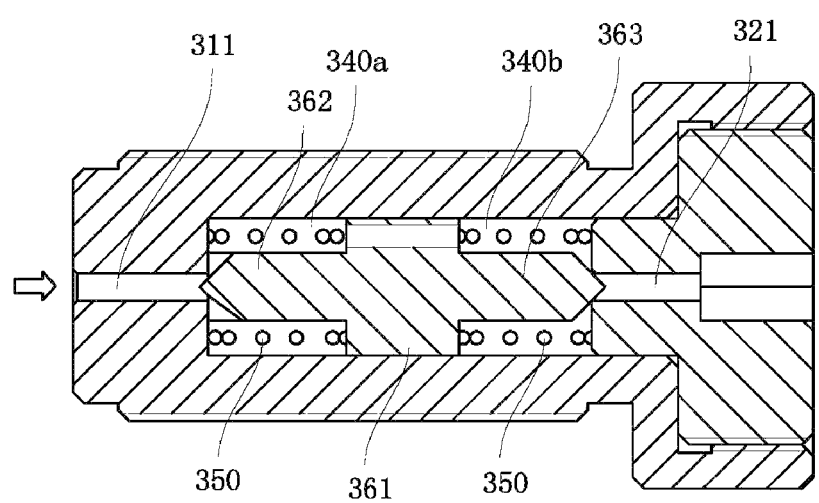
FIG. 9 is a schematic diagram of the state of the bidirectional self-locking valve when the piston rod is extended.

Referring to FIG. 9, similarly, when the bidirectional self-locking damper 10 receives an external load force exceeding the expected range, the bidirectional self-locking valve 300 is in a closed state. At this time, the piston rod 100 is in the extended state. The spool unit 360 is driven to move toward the side of the second passage channel 321 since the external load force is too large to overcome the elastic force of one of the elastic compensation units 350. And, the tapered sealing surface of the second tip 3631 gradually abuts against the opening of the second passage channel 321 until the communication between the second passage channel 321 and the second chamber 340b is completely interrupted. The work medium can only enter the oil storage chamber 13 from the overflow passage 512 for unidirectional flow. Similarly, the entire bidirectional self-locking damper 10 will generate a huge damping force to suppress the displacement of external components.

Figure 10:
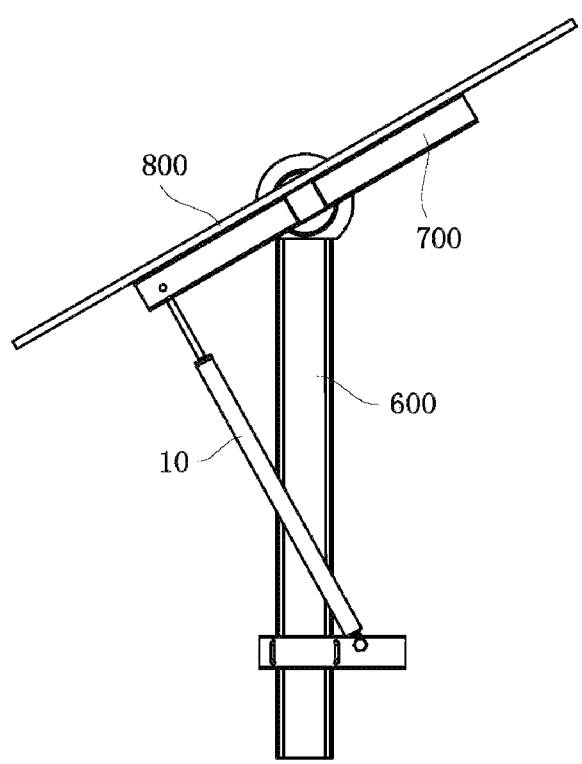
FIG. 10 is a schematic diagram of the connection between the bidirectional self-locking damper and a photovoltaic panel unit.

FIG. 10 shows the state of the bidirectional self-locking damper 10 applied to a photovoltaic panel template. One end of the bidirectional self-locking damper 10 is connected to the main body support 600, and the other end thereof is connected to the mount frame 700, and the photovoltaic panel unit 800 is provided on the mount frame 700. The photovoltaic panel unit 800 when in a normal angle adjustment in this embodiment can ensure that the bidirectional self-locking valve 300 in the activated state does not affect the rotation of the photovoltaic panel unit 800. When the external wind speed is too high, that is, when the external load force exceeds the expected range, the bidirectional self-locking damper 10 will generate a huge damping force to realize the supporting and limiting effect to the photovoltaic panel unit 800, thereby effectively reducing the magnitude of the shaking of the photovoltaic panel unit 800.

When the photovoltaic panel unit 800 receives a load force outside the expected range and causes its displacement speed to be between 013 and 0.020 m/s, the bidirectional self-locking damper can generate a damping force greater than 30000N.

The above are the preferred embodiments of the application, and do not limit the scope of protection of the application accordingly. Therefore: all equivalent changes made in accordance with the structure, shape, and principle of the application shall be covered by the scope of protection of the application.

What is claimed is:

1. A bidirectional self-locking damper, comprising a cylinder sealed with a work medium and a piston assembly housed in the cylinder and displaceable along the axial direction of the cylinder, wherein the piston assembly comprises:
   a piston rod, that comprises a working portion extending into the cylinder and a first mounting portion extending out of the cylinder;
   a piston that is connected to the working portion and divides the cylinder into a recovery pressure chamber and a compression pressure chamber; and
   a bidirectional self-locking valve that is connected to the working portion, the bidirectional self-locking valve comprising:
   a valve body that is provided with a passage chamber and a first passage channel and a second passage channel that are communicated with the passage chamber, the first passage channel communicating with the recovery pressure chamber, and the second passage channel communicating with the compression pressure chamber;
   a locking assembly that is placed in the passage chamber;
   wherein the locking assembly is directed to displace in the passage chamber driven by the work medium for establishing/interrupting the communication between the first passage channel or the second passage channel and the passage chamber;
   wherein the locking assembly is used to establish or interrupt the communication between the passage chamber and one of the first passage channel and the second passage channel, so that the other passage channel is always kept in communication with the passage chamber;
   wherein the locking assembly comprises:
   a spool unit that comprises a main body and a first locking portion and a second locking portion that are respectively connected at both sides of the main body for establishing or interrupting the communication between the first passage channel or the second passage channel and the passage chamber; and
   an elastic compensation unit that is distributed on both sides of the main body for forcing the spool unit to perform resetting movement; and
   wherein the first locking portion comprises a first tip, the second locking portion comprises a second tip, the first tip and the second tip both have a tapered sealing surface, and one of the tapered sealing surfaces is provided with a diversion section; when the tapered sealing surface with the diversion section abuts against the opening of the first passage channel/the second passage channel, an overflow port that is communicated with the passage chamber is formed between the first passage channel/the second passage channel and the diversion section.

2. The bidirectional self-locking damper according to claim 1, wherein the main body divides the passage chamber into a first chamber and a second chamber, and an outer peripheral surface of the main body abuts against the inner wall of the passage chamber, and the main body is provided with at least one damping channel communicating the first chamber with the second chamber.

3. The bidirectional self-locking damper according to claim 1, wherein the valve body comprises a valve seat and a valve cover;

the passage chamber and the first passage channel are provided in the valve seat, and a locking groove communicating with the passage chamber is provided in one end of the valve seat;

the second passage channel is provided on the valve cover;

the valve cover comprises a base and an extension portion connected to one end of the base, an outer peripheral surface of the base is in sealing connection with the inner wall of the locking groove, and an end face of the base abuts against the bottom of the locking groove and forms a first sealing portion, and the extension portion is introduced into the passage chamber from one end of the base.

4. The bidirectional self-locking damper according to claim 3, wherein an outer peripheral surface of the valve seat and the inner wall of the damping chamber are in a sealed connection, and an end face of the valve seat and an end face of the working portion abut and form a second sealing portion.

5. The bidirectional self-locking damper according to claim 1, wherein the working portion has a damping chamber communicating the recovery pressure chamber with the compression pressure chamber, and the bidirectional self-locking valve is mounted in the damping chamber.

6. The bidirectional self-locking damper according to claim 5, wherein the piston rod is provided with an inlet channel and a transfer channel, the inlet channel communicates the recovery pressure chamber with the transfer channel, and the transfer channel communicates with the damping chamber; wherein the inlet channel and the transfer channel are communicated and form an angle.

7. The bidirectional self-locking damper according to claim 6, wherein the damping chamber has a flaring communicating with the transfer channel.

* * * * *